(12) United States Patent
Zeng

(10) Patent No.: US 6,895,994 B2
(45) Date of Patent: May 24, 2005

(54) SELF-OPERATED PROTECTION DEVICE FOR PIPELINE

(76) Inventor: Xiangwei Zeng, 11, 4$^{th}$ Section of Renmin Nanlu, Chengou City, Sichuan Province 610041 (CN)

( * ) Notice: Subject to any disclaimer, the term of this patent is extended or adjusted under 35 U.S.C. 154(b) by 0 days.

(21) Appl. No.: 10/910,380

(22) Filed: Aug. 3, 2004

(65) Prior Publication Data
US 2005/0022873 A1 Feb. 3, 2005

Related U.S. Application Data

(63) Continuation of application No. 10/240,008, filed as application No. PCT/CN01/00139 on Feb. 22, 2001, now abandoned.

(30) Foreign Application Priority Data

Mar. 27, 2000 (CN) .......................................... 00112797 A

(51) Int. Cl.$^7$ ................................................. G05D 7/01
(52) U.S. Cl. ...................... 137/460; 137/486; 137/489.5
(58) Field of Search ................................. 137/460, 486, 137/488, 489, 489.5, 491, 492.5

(56) References Cited

U.S. PATENT DOCUMENTS 2,266,533 A * 12/1941 Brisbane et al. ............ 137/460
3,489,165 A * 1/1970 Salerno .................... 137/489.5
4,004,607 A * 1/1977 Freese ......................... 137/486
4,442,680 A * 4/1984 Barbier et al. ........... 137/489.5

FOREIGN PATENT DOCUMENTS

| FR | 2689607 | * | 10/1993 |
| FR | 2716950 | * | 9/1995 |
| FR | 2741137 | * | 5/1997 |

* cited by examiner

Primary Examiner—Stephen M. Hepperle
(74) Attorney, Agent, or Firm—Nelson Mullins Riley & Scarborough, LLP

(57) ABSTRACT

A protection device which is capable of cutting off a pipeline when the pipeline leaks due to the rupture of the pipe self-operatedly closes the pipeline using fluid kinetic energy. A control rod converts linear movement of a piston into the opening and closing movement of a main valve core. The piston separates a hydraulic cylinder chamber into a first chamber and a second chamber. A restoring spring in the first chamber restores a control piston to an initial position. A control valve in the second chamber controls discharge of fluid from the second chamber. A flow state-sensing device introduces fluid in the fluid pipe to the second chamber when the fluid pipe ruptures and leaks.

9 Claims, 1 Drawing Sheet

SELF-OPERATED PROTECTION DEVICE FOR PIPELINE

Figure 1:
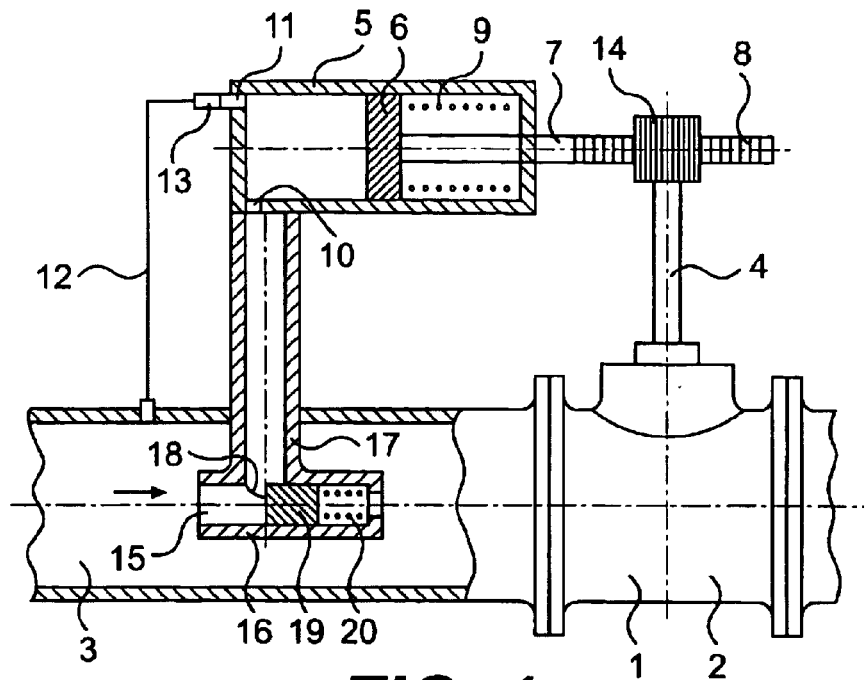

The present application is a continuation of U.S. application Ser. No. 10/240,008, filed Mar. 4, 2003, now abandoned, the entire disclosure of which in incorporated by reference herein which is the National Stage of International Application No. PCT/CN01/00139, filed Feb. 22, 2001.

FIELD OF THE INVENTION

The present invention relates to a control device for fluid pipelines, and particularly to a protection device which is capable of automatically cutting off the pipelines for long distance fluid-transportation when leakage occurs due to pipe rupture.

BACKGROUND OF THE INVENTION

Conventional protection devices for pipelines are provided with a coupled gas-liquid emergency cut-off system. When a signal is generated indicative of a pressure drop caused by a pipe rupture, the system utilizes a plurality of valves and energy accumulating tanks to multistagedly transmit, transform and amplify the signal to generate a thrust large enough to push a hydraulic driving device so as to drive a ball valve to cut-off the flow path. Such a pipeline protection system has a complicated structure and a long signal transmission route, and it is therefore necessary to utilize external forces generated by energy cumulating tanks and the like to achieve the protection of pipelines.

SUMMARY OF THE INVENTION

In view of this, the object of the invention is to provide a self-operated protection device for pipeline which can cut off the pipeline by itself by means of the fluid in the pipeline when the pipeline ruptures.

The invention utilizes the feature that the flow rate of the fluid in a fluid pipeline changes abruptly when the fluid leaks due to the rupture of the pipeline, and a flow state-sensing device is provided in the flow passage to sense the abrupt change of the flow rate. Fluid is introduced into a control cylinder, and a control rod connected with a piston drives a main valve stem to control the closing and opening of a main valve.

To achieve above object, there is provided a self-operated pipeline protection device comprising a main valve and a control device for the main valve. The main valve comprises a valve body communicating with a fluid pipe, a main valve core provided in the valve body and a main valve stem connected with the main valve core.

The control device comprises a piston hydraulic control cylinder, a control rod being connected with a control piston disposed in the hydraulic cylinder. The control rod is operationally connected with the main valve stem for converting linear movement of the piston into the opening and closing movement of the main valve core. The cylinder chamber of the hydraulic cylinder is separated by the piston into a first chamber and a second chamber. A restoring spring is provided in the first chamber for restoring the control piston to its initial position. The second chamber is formed with a first cylinder port for discharging fluid from the second chamber, and a control valve is provided for controlling the discharge of the fluid from the second chamber via the first cylinder port.

A flow state-sensing device senses a flow rate of fluid in the fluid pipe and controls connection or disconnection between the fluid pipe and the second chamber of the hydraulic cylinder according to the flow rate of the fluid in the fluid pipe. The flow state-sensing device connects the fluid pipe with the second chamber of the hydraulic cylinder when the flow rate of the fluid exceeds a preset value.

Preferably, the flow state-sensing device comprises a flow state-sensing tube and a flow state-control tube communicating with the flow state-sensing tube via a valve seat. In the flow state-sensing tube there is provided a valve core, which can open or close the valve seat, and a restoring spring for restoring the valve core to its initial position. The flow state-sensing tube is open to the flow passage of the fluid pipe, and the flow state-control tube communicates with the second chamber of the hydraulic cylinder. The valve core and the valve seat are in an open state when the flow rate of the fluid exceeds a preset flow rate.

Preferably, the flow state-sensing device is provided in the main valve core, and the flow state-control tube of the flow state-sensing device extends axially through the tubular main valve stem.

Preferably, the protection device further comprises a pressure accumulating cylinder which connects the flow state-control tube with the second chamber of the hydraulic cylinder. A gas pocket is provided in the pressure accumulating cylinder, and a reverse damping valve is provided in the passage which connects the second chamber of the hydraulic cylinder and the pressure accumulating cylinder.

Preferably, the first chamber of the hydraulic cylinder is formed with a second cylinder port, and the second cylinder port is communicated with the fluid pipe via a pipeline. A reverse damping valve is provided in the second cylinder port or in the pipeline connecting the second cylinder port and the fluid pipe, and the flow state-sensing tube is located approximately at the center of the fluid pipe.

Preferably, the first cylinder port is connected with the fluid pipe via a pipeline.

Preferably, the control valve is a solenoid valve or a manually operated valve.

Preferably, the flow state-sensing tube is arranged along the streamline of the fluid in the fluid pipe and is connected with the flow state-control tube in T shape.

Preferably, the control rod of the hydraulic cylinder is formed with a rack, and the rack engages with a gear mounted on the main valve stem of the main valve.

The main valve can be an external-operated valve, such as a ball valve, a sluice valve, a butterfly valve, a control valve, a shuttle control valve, a stop valve, a shuttle stop valve and etc.

The protection device with the above-mentioned structure has the following advantages and effects.

1. The flow-sensing device and the control cylinder of the present invention utilizes the dynamic pressure difference at the two ends of the flow-sensing tube of the flow state-sensing device. The pressure difference is generated by the abrupt change of the flow rate of the fluid in the fluid pipe caused by the fluid leakage due to the rupture of the pipeline and pushes the valve core, so that the valve core and the valve seat, which are normally in a closed state, change to an open state. The fluid enters the control cylinder from the flow-sensing tube via the valve seat and the flow state-control tube, pushing the control piston which closes the main valve by means of the transmission of the control rod and the main valve stem. As a result, the pipeline is protected and leakage loss of the fluid is prevented. After the main valve is closed, the valve core is restored under the action of the restoring spring, and the valve core and the valve seat are in a closed state. When the trouble is removed, it is possible to make the main valve return to its open position again by operating the control cylinder, thereby achieving the control of the main valve. The present invention has the advantage of self-operatedly controlling the closing and opening of the main valve to protect a fluid pipeline by using fluid kinetic energy. Particularly, since the flow state-sensing device can receive the change of the fluid kinetic energy on both sides of the main valve, the invention has the advantage of being able to carry out bidirectional sensing. There is no need for manual operation.

2. The present invention has an integral structure with the flow state-sensing device being provided in the flow passage of the main valve core of the main valve, thus having a small overall volume and being convenient to be installed on a pipeline. The gas pocket in the pressure accumulating cylinder accumulates pressure energy in the early part of the period, during which the fluid enters the control cylinder via the pressure accumulating cylinder, when the kinetic energy of the fluid is larger. The pressure energy is released in the later part of the period when the kinetic energy of the fluid is smaller with the main valve being gradually closed, thereby ensuring the reliable closing of the main valve.

3. With a solenoid valve being provided at the cylinder port of the control cylinder in the self-operated protection device of the invention, the remote control of the protection device can be achieved. With a manually operated valve being provided at the cylinder port of the control valve, after self-operatedly closing the main valve through the flow state-sensing device and the control valve, the valve is opened manually to have the main valve and the control cylinder restored.

4. The reverse damping valve provided at the cylinder port of the control cylinder according to the present invention has a time delay function so as to keep the current state of the main valve—that is, an opening state or a closing state of the main valve.

5. According to the invention, the control rod of the control cylinder and the main valve stem forms a rack and gear mechanism, thus having a simple structure and being reliable in operation.

BRIEF DESCRIPTION OF THE ACCOMPANYING DRAWINGS

Figure 2:
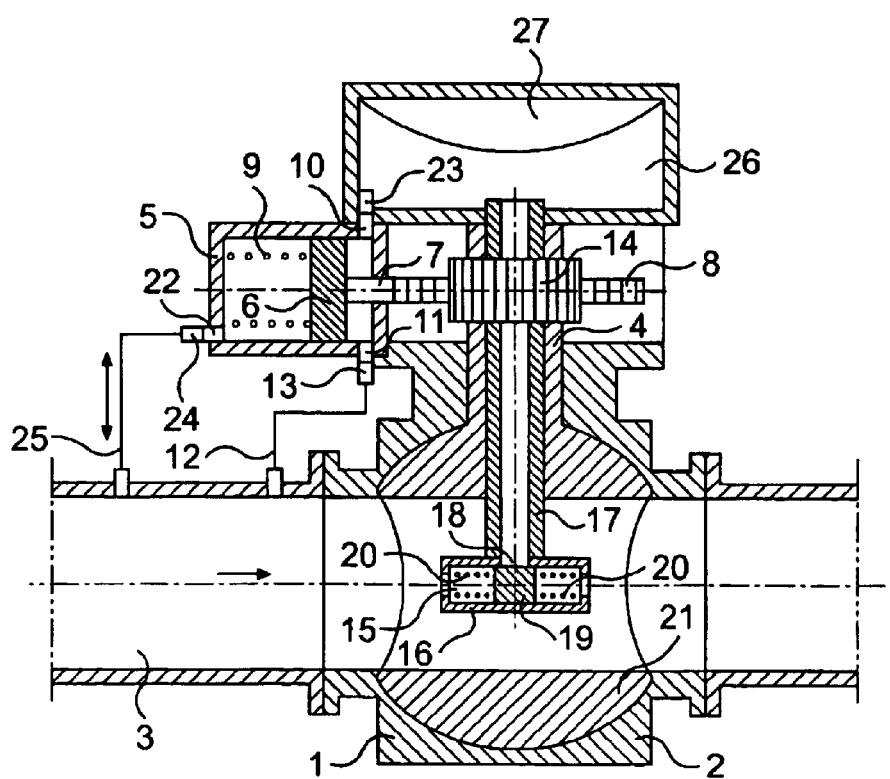

The preferred embodiments of the invention will be described in detail in connection with the accompanying drawings, in which FIG. 1 is a schematic view showing the structure of the self-operated protection device for pipeline in accordance with the first preferred embodiment of the present invention, in which the flow state-sensing device is in an open state;

FIG. 2 is a schematic view showing the structure of the self-operated protection device for pipeline in accordance with the second preferred embodiment of the present invention, in which the flow state-sensing device is in a closed state and the main valve is in a working state for fluid transportation.

DETAILED DESCRIPTION OF THE PREFERRED EMBODIMENTS

Embodiment 1

As shown in FIG. 1, the self-operated protection device for pipeline of the first embodiment of the present invention is comprised of a main valve 1 and a control device. The control device is comprised of a control cylinder 5, a fluid state-sensing device 15 and etc.

The main valve 1 comprises a valve body 2 having a cavity of a conventional shape and is connected to a fluid pipe 3 in a conventional manner. On the upper end of the valve body there may be provided a valve cover. The valve body can be integral with the valve cover as usual, or they can be separate members and coupled with each other through a flange. The main valve stem 4 of the main valve can be fixedly connected to the main valve core of the main valve, and the main valve with such a structure can be a ball valve, a control valve, a stop valve and etc. The main valve stem 4 can also be rotatably connected to the valve core of the main valve, the valve core being able to reciprocate. The main valve with such a structure can be a gate valve, a sluice valve, a plunger valve and etc.

The control cylinder 5 is a traditional cylindrical hydraulic cylinder. In the cylinder there is a cylindrical control piston 6 of traditional structure and a rod-shaped control rod 7 connected to the control piston. The portion of the control rod extending out of the cylinder is formed into a rack 8. In the chamber of the control cylinder on the right side of the piston there is provided a helical spring 9 for restoring the control piston to its initial position. At the other end of the control cylinder there are formed a cylinder port 10 and a cylinder port 11. The cylinder port 11 is communicated with the fluid pipe 3 via a pipeline 12 connected with the cylinder port and the fluid pipe in a conventional manner. A control valve 13 is provided in the cylinder port 11 or in the pipeline 12 immediately adjacent to the cylinder port. A conventional solenoid valve may be used as the control valve, or, instead of a solenoid valve, a manually operated valve such as a manually operated gate valve can also be used. The control cylinder can be arranged so that its control rod 7 is perpendicular to the main valve stem 4. On the main valve stem there is fixedly mounted a gear 14 which meshes with the rack 8 so that the main valve stem rotates as the control rod reciprocates.

A flow state-sensing device 15 is provided in the fluid pipe 3. The flow state-sensing device comprises a shell in the form of a T-shaped tube, having a flow state-sensing tube 16 and a flow control tube 17 which are both in the form of a circular pipe. The flow state-sensing tube is open to flow passage of the fluid pipe at the center of the fluid pipe in the flowing direction of the fluid, and the flow control tube 17 is perpendicularly connected to the flow state-sensing tube and communicates therewith. At the junction of the flow state-sensing tube and the flow control tube there is a valve seat 18 formed by the intersection of the two tubes, and in the flow state-sensing tube there is provided a cylindrical valve core 19 which can slide so as to close or open the valve seat. A helical restoring spring 20 is provided in the flow state-sensing tube on one side of the valve core for restoring the valve core to its initial position. Such a flow state-sensing device has a unidirectional flow state-sensing function. It is possible to provide a restoring spring on either side of the valve core, and thereby the flow state-sensing device has a bidirectional flow state-sensing function.

The flow control tube 17 extends through the fluid pipe 3 and is connected with the cylinder port 10 of the control cylinder. The flow control tube is fixedly connected to the control cylinder 5 in a conventional manner or is integral with the control cylinder 5. The flow state-sensing device 15, together with the control cylinder 5, is fixedly connected to the fluid pipe. The connecting portion between the flow state-sensing device and the fluid pipe should be sealed with traditional sealing means.

The present protection device is used for self-operatedly closing the fluid pipe when a pipeline ruptures and leaks during fluid transportation.

When the protection device is in its working state for fluid transportation, the main valve 1 is in a fully open state, and the valve core 19 of the flow state-sensing device 15 is seated on the valve seat 18 to close the valve seat, i.e. the flow state-sensing device is closed. The control piston 6 is located on the left side in the control cylinder 5, and the solenoid valve 13 is in a closed state—that is, the, cylinder port 11 of the control cylinder 5 and the pipeline 12 are closed.

When the fluid pipe ruptures, and thus fluid leaks, the flowing speed of the fluid in the fluid pipe will increase abruptly, and the valve core 19 in the flow state-sensing device will be impacted by the high speed fluid and moves rightward against the restoring spring 20. As a result, the valve core 19 moves away from the valve seat to be in an open state—i.e. the flow state-sensing device 15 is opened. The fluid enters the left chamber of the control cylinder 5 via the flow state-sensing tube 16, the valve seat 18, the flow state-control tube 17 and the cylinder port 10 of the control cylinder, pushing the control piston 6 to move rightward against the spring 9. The control rod 7 moves rightward with the control piston, driving the gear 14 and hence the main valve stem 4 to rotate through the rack 8 on the control rod to close the main valve 1, thereby cutting off the fluid flow in the fluid pipe and achieving the protection of a pipeline. When the fluid flow in the fluid pipe is cut off, the flow speed of the fluid in the fluid pipe becomes zero, and the valve core 19 in the flow state-sensing device 15 moves leftward and returns to its initial position under the action of the restoring spring 20 so that the valve core 19 is seated on the valve seat 18, and the flow state-sensing device is closed. After the pipeline is restored, the solenoid valve is opened, and the control piston 6 moves leftward under the action of the spring 9, thereby discharging the fluid in the left chamber of the control cylinder 5 into the fluid pipe 3 via the cylinder port 11, the solenoid valve 13 and the pipeline 12. At the same time, the control piston 6 drives the control rod 7 to move leftwards to its initial position, and the rack 8 on the control rod reversely drives the gear 14, and hence the main valve stem 4, to rotate. The main valve is thus restored and fully opened, and the fluid pipe returns to the working state for fluid transportation.

Embodiment 2

As shown in FIG. 2, the self-operated protection device for pipeline of the second embodiment of the invention is comprised of a main valve and a control device, the control device being comprised of a control cylinder 5, a flow state-sensing device and etc.

The structure of the main valve 1 of the second embodiment is substantially the same as that of the first embodiment. A ball valve is used as the main valve, the main valve stem 4 is formed into a circular tube, and the tube is communicated with the flow passage of the main valve core 21.

The structure of the control cylinder 5 of the second embodiment 2 is substantially the same as that of the first embodiment 1. The control cylinder is transversely arranged and is connected to the valve cover on the upper end of the main valve on the left side of the valve cover. At the right end of the control cylinder there are a cylinder port 10 and a cylinder port 11, and at the left end there is a cylinder port 22. At the cylinder port 10 there is provided a conventional reverse damping valve 23. At the cylinder port 11 there is provided a conventional solenoid valve 13, and the cylinder port 11 is communicated with the fluid pipe 3 via a pipeline 12. At the cylinder port 22 there is provided a conventional reverse damping valve 24, and the cylinder port 22 is communicated with the fluid pipe 3 via a pipeline 25.

The protection device of the second embodiment of the invention further comprises a pressure accumulating cylinder 26. The pressure accumulating cylinder 26 can be formed into a cylindrical tank and is fixedly mounted on the control cylinder 5 and the main valve 1. In the pressure accumulating cylinder there is provided a conventional gas pocket 27 filled up with gas. The cylinder port 10 is commonly used by both the pressure accumulating cylinder and the control cylinder, and the pressure accumulating cylinder is communicated with the right chamber of the control cylinder 5 via the reverse damping valve 23.

The flow state-sensing device 15 of the second embodiment is substantially the same as that described in connection with the first embodiment. The differences lie in that: the flow state-sensing tube of the flow state-sensing device is located at the center of the flow passage of the main valve core 21 of the main valve 1, and the flow state-control tube 17 of the flow state-sensing device extends axially upward through the main valve stem 4 and extends into the pressure accumulating cylinder 26. Sealing means are respectively provided between the flow state-control tube, the main valve stem and the shell of the pressure accumulating cylinder so as to prevent the fluid from leaking.

When the present protection device is in a working state for fluid transportation, as shown in FIG. 2, the valve core 19 of the flow state-sensing device 15 is seated on the valve seat 18 to close the valve seat, i.e. the flow state-sensing device is in a closed state, and the solenoid valve 13 at the cylinder port 11 of the right chamber of the control cylinder 5 is in a closed state. The fluid in the fluid pipe 3 enters the left chamber of the control cylinder 5 via the pipeline 25, the reverse damping valve 24 and the cylinder port 22, while the fluid in the right chamber enters the pressure accumulating cylinder 26 via the cylinder port 10 and the reverse damping valve 23 and compresses the gas pocket 27, and under the combined action of the spring 9, the control piston 6 is caused to be positioned and retained on the right side in the cylinder, ensuring that the main valve 1 is in a fully open state.

Whether the fluid in fluid pipe 3 flows in the forward direction from left to right or flows in a reverse direction from right to left, and regardless whether the fluid pipe ruptures on the right side or on the left side of the main valve, the protection device can achieve the protection of the pipeline. When the fluid flows in the forward direction and the fluid pipe ruptures and the fluid leaks, the high speed fluid enters the flow state-sensing device 15 from the left side, pushing the valve core 19 to move rightward and compress the restoring spring 20 on the right side of the valve core. When the fluid flows in an opposite direction and the fluid pipe ruptures, the high speed fluid enters the flow state-sensing device 15 from the right side, pushing the valve core 19 to move leftward and compress the restoring spring 20 on the left side of the valve core. In both cases, the valve core and the valve seat are caused to be in an open state—that is, the flow state-sensing device 15 is opened. Since the flow state-sensing tube 16 is located approximately at the center in the fluid pipe 3 where the flow speed and the pressure of the fluid are higher than the flow speed and the pressure of the fluid in the vicinity of the wall of the fluid pipe, the fluid having a higher pressure than the fluid in the vicinity of the pipe wall enters the pressure-accumulating cylinder 26 via the flow state-sensing tube 16, the valve seat 18 and the flow state-control tube 17, compresses the gas pocket 27, and then enters the right chamber of the control cylinder 5 via the reverse damping valve 23 and the cylinder port 10 of the control cylinder. The higher pressure fluid pushes the control piston to move leftward and compress the spring 9. At the same time, the fluid in the left chamber is discharged into the fluid pipe 3 via the cylinder port 22, the reverse damping valve 24 and the pipeline 25. Under the combined action of the gas pocket 27, which releases pressure and expands, the control rod 7 moves leftward with the control piston, driving through the rack 8 on the control rod the gear 14 and hence the main valve stem 4 to rotate to close the main valve 1. During the closing process of the main valve, the flow speed and the pressure of the fluid in the fluid pipe decreases gradually, and the valve core 19 of the flow state-sensing device 15 closes gradually under the action of the restoring spring 20 to ensure the reliable closing of the main valve, thus cutting off the fluid in the fluid pipe to achieve the protection of the pipeline. At this point, the valve core 19 in the flow state-sensing device 15 returns to its initial position under the action of the restoring spring 20. The valve core 19 is seated on the valve seat 18, and the flow state-sensing device is in a closed state. When the pipeline is restored, the flow state-sensing device remains in its closed state. The solenoid valve 13 at the cylinder port 11 at the right end of the control cylinder 5 is opened, and the fluid in the right chamber of the control cylinder is discharged into the fluid pipe 3 to release pressure via the cylinder port 11, the solenoid valve 13 and the pipeline 12. Under the action of the spring 9, the control piston 6, together with the control rod 7, moves rightward to its initial position, the rack 8 on the control rod reversely drives the gear 14 and hence the main valve stem 4 to rotate, the main valve 1 is restored until it is fully opened, and the present protection device resumes its working state for fluid transportation.

According to this embodiment, since the cylinder port 11 of the control cylinder 5 is connected with the fluid pipe 3 via the pipeline 12, the particular advantage is that, during operation, the fluid in the right chamber of the control cylinder 5 is discharged into the fluid pipe 3 and will not be discharged to the outside, thus protecting the environment from being polluted by the fluid and reducing the discharge loss of the fluid. Alternatively, the pipeline 12 connected to the cylinder port 11 of the control cylinder 5 may open to the atmosphere, or a reservoir can be additionally provided at the outlet of the pipeline so that the fluid from the control cylinder may be discharged into the reservoir. With this arrangement, when the control cylinder is about to return to its initial position after the pipeline is restored, the pressure in the right chamber of the control cylinder is the atmospheric pressure, making the return more reliable but with a little fluid being discharged outside from the pipeline 12.

What is claimed is:

1. A self-operated protection device for pipeline, comprising:

a main valve and a control device for the main valve, said main valve comprising a valve body communicating with a fluid pipe, a main valve core provided in the valve body and a main valve stem connected with the main valve core, wherein said control device comprises a piston hydraulic control cylinder, a control rod being connected with a control piston disposed in the hydraulic control cylinder, said control rod being operationally connected with said main valve stem for converting linear movement of said piston into opening and closing movement of said main valve core;

a cylinder chamber of said hydraulic control cylinder being separated by said piston into a first chamber and a second chamber, a restoring spring being provided in said first chamber for restoring said control piston to an initial position, said second chamber being formed with a first cylinder port for discharging fluid from said second chamber, and a control valve being provided for controlling discharge of the fluid from the second chamber via said first cylinder port;

a flow state-sensing device for sensing a flow rate of fluid in said fluid pipe and controlling connection of disconnection between said fluid pipe and said second chamber of said hydraulic control cylinder according to the flow rate of the fluid in said fluid pipe, wherein said flow state-sensing device connects said fluid pipe with said second chamber of the hydraulic control cylinder when the flow rate of the fluid exceeds a preset valve.

2. The self operated protection device for pipeline as claimed in claim 1, wherein said flow state-sensing device comprises a flow state-sensing tube and a flow state-control tube communicating with the flow state-sensing tube via a valve seat, wherein in the flow state-sensing tube there is provided a second valve core which can open or close the valve seat and a restoring spring for restoring said second valve core to an initial position, wherein the flow state-sensing tube is open to flow passage of the fluid pipe, wherein the flow state-control tube communicates with said second chamber of said hydraulic control cylinder, and wherein said second valve core and said valve seat are in an open state when the flow rate of the fluid exceeds a preset flow rate.

3. The self-operated protection device for pipeline as claimed in claim 2, wherein said flow state-sensing device is provided in said main valve core, and wherein said flow state-control tube of the flow state-sensing device extends axially through the main valve stem.

4. The self-operated protection device for pipeline as claimed in claim 3, further comprising a pressure accumulating cylinder which connects said flow state-control tube with said second chamber of the hydraulic control cylinder, wherein a gas pocket is provided in the pressure accumulating cylinder, and a reverse damping valve is provided in a passage which connects said second chamber of the hydraulic cylinder and said pressure accumulating cylinder.

5. The self-operated protection device for pipeline as claimed in claim 4, wherein said first chamber of the hydraulic control cylinder is formed with a second cylinder port, wherein said second cylinder port is communicated with said fluid pipe via a pipeline, wherein a reverse damping valve is provided in said second cylinder port or in said pipeline communicating said second cylinder port and the fluid pipe, and wherein said flow state-sensing tube is located approximately at the center of said fluid pipe.

6. The self-operated protection device for pipeline as claimed in any one of claims 1–5, wherein said first cylinder port is connected with said fluid pipe via pipeline.

7. The self-operated protection device for pipeline as claimed in any one of claims 1–5, wherein said control valve is a solenoid valve or a manually operated valve.

8. The self-operated protection device for pipeline as claimed in any one of claims 2–5, wherein said flow state-sensing tube is arranged along a streamline of fluid in said fluid pipe and is connected with said flow state-control tube in T shape.

9. The self-operated protection device for pipeline as claimed in any one of claims 1–5, wherein said control rod of said hydraulic control cylinder is formed with a rack, and said rack engages with a gear mounted on said main valve stem of said main valve.

* * * * *